May 1, 1951 B. N. FISHER 2,550,794

TONE ARM AND OPERATING MECHANISM FOR AUTOMATIC RECORD CHANGER PHONOGRAPHS

Filed April 26, 1946 5 Sheets-Sheet 1

INVENTOR
BERNE N. FISHER
BY James & Franklin
ATTORNEYS

INVENTOR
BERNE N. FISHER
BY James & Franklin
ATTORNEYS

INVENTOR
BERNE N. FISHER
BY
James & Franklin
ATTORNEYS

INVENTOR
BERNE N. FISHER
BY James & Franklin
ATTORNEYS

INVENTOR
BERNE N. FISHER
BY James & Franklin
ATTORNEYS

Patented May 1, 1951

2,550,794

UNITED STATES PATENT OFFICE 2,550,794

TONE ARM AND OPERATING MECHANISM FOR AUTOMATIC RECORD CHANGER PHONOGRAPHS

Berne N. Fisher, New York, N. Y., assignor to General Instrument Corporation, Elizabeth, N. J., a corporation of New Jersey Application April 26, 1946, Serial No. 665,015

11 Claims. (Cl. 274—10)

This invention relates to a record changer phonograph and more particularly to a record changer phonograph of the record drop-feed or gravity-feed type in which the records may be automatically played on both of their opposite sides.

The prime object of the present invention centers about the provision of a record changer phonograph in which there are arranged in vertical superposed relation a record supply station, a record playing station and a played record receiving station, and in which the records drop-fed individually from the supply station are played on their opposite sides at the playing station from which the individual played records are then drop-fed to the record receiving station.

Another object of the present invention is directed to the provision of such a record changer phonograph designed to permit a supply of records to be selectively played either on their opposite sides or on one side only.

In carrying out these stated objects, it is the particular object of the present invention to produce a new and improved reproducer or tone arm assembly for playing the opposite sides of a record at a playing station, and an operating mechanism therefor.

This application is related to the co-pending application of Maxwell James and Berne N. Fisher, Serial No. 663,016, filed April 18, 1946, in which application the complete phonograph record changer of the present invention is disclosed. The present application is particularly directed to the tone arm and its operating mechanism.

To the accomplishment of the foregoing and such other objects as may hereinafter appear, the invention pertains to the tone arm assembly and operating mechanism of the record changer phonograph and the various component parts thereof, in combination and sub-combination, as sought to be defined in the appended claims and as described in the following specification taken together with the accompanying drawings in which:

*General assembly and operation of the record feed and playing mechanisms*

Figure 1:
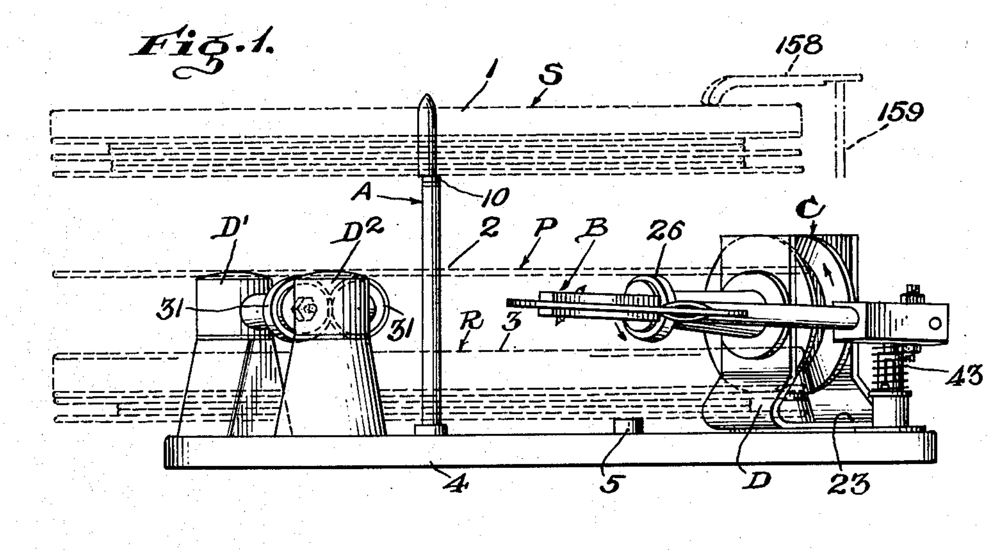
Fig. 1 is an elevational view of the top of the record changer phonograph of the invention showing the position the parts assume when ready for bottom side playing of a record.
Figure 2:
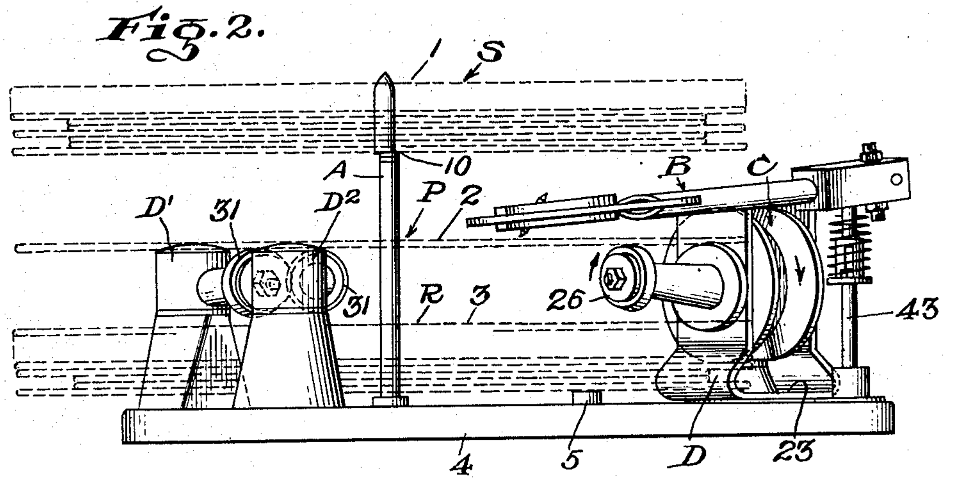
Fig. 2 is a similar view thereof and showing the position the parts assume when ready for top side playing of a record.

Referring now more in detail to the drawings, and referring first to Figs. 1 and 2 thereof, the record changer phonograph of the present invention comprises a drop-feed, double-side-playing record changer phonograph having in vertical superposed relation a record supply station generally designated as S, a record playing station generally designated as P, and a played record receiving station generally designated as R, and comprising means for supporting one or more records such as the supply of records 1 at the record supply station, means for drop-feeding a record from the supply station such as the record 2 to the playing station, means at the record playing station for playing first one side such as the under side of the record 2 (see Fig. 1) and then the other side such as the top side of the record 2 (see Fig. 2), and means for then drop-feeding the played record 2 to the played record receiving station such as is illustrated by the record 3 at this latter station.

The means for supporting the record supply at the record supply station S may take the form of any known magazine supporting means for record changers of the drop-feed type, and in the present embodiment of the invention such means is combined with the means for drop-feeding a record from the record supply to the record playing station, this combinative means being embodied in the central spindle device generally designated as A. This central spindle device at the record feeding button 10 supports a stack of records 1 at the supply station as depicted in Figs. 1 and 2 of the drawings, from which the bottommost record is drop-fed by the button 10 in the operation of the machine to the playing station P, guided thereto by the said central spindle. The record 2 is supported as a single record at the playing station, and after its opposite sides are played it is drop-fed to and stacked on a stationary platform 4 which may be provided with the receiving stud supports 5, 5, movement from the playing station to the record receiving station being also guided by the central spindle A, the played records stacking up into the record stack 3 shown in Figs. 1 and 2.

The means at the record playing station P for playing first one side and then the other side of the record comprises in combination, a reproducer or tone arm B which is operable to a position for playing the bottom side of the record depicted in Fig. 1 and to a position for playing the top side of the record depicted in Fig. 2, and a record rotating mechanism generally designated as C which is operable as indicated by the arrows in Figs. 1 and 2 of the drawings for rotating the record 2 at the playing station first in one direction for bottom side playing and then in the reverse direction for top side playing.

Preferably the record rotating means C has embodied therein means for supporting the record at the playing station and this part of the mechanism generally designated as D is combined with two other spaced supports D′ and D² for receiving and supporting the record at the playing station.

These record receiving and supporting means D, D′ and D² are also preferably made to constitute the means for drop-feeding the record from the playing station P to the played record receiving station R after both sides of the record have been played at the playing station or after one side only of the record has been played at the record playing station if and when such latter method of playing is selected as the operation for the phonograph.

The record receiving and supporting means D, D′ and D² are in a position in Figs. 1 and 2 to intercept and receive the lowermost record dropped from the stack supply 1 and to support the same for a playing operation. This means also embodied driving elements including the record engaging wheels 26, 31 and 31 forming part of the record rotating means C which rotate the record at the playing station in either of its opposite directions. When a record has been played at the playing station, the record receiving and supporting means D, D′ and D² are moved outwardly about their vertical axes (simultaneously) to record non-supporting positions; and in their movement to such positions the played record 2 is released from the said supporting means and therefore is drop-fed to the record receiving station R. When returned to their positions shown in Figs. 1 and 2, the receiving and supporting means D, D′ and D² intercept, receive and drive the next record fed from the bottom of the record stack 1 at the supply station.

The depletion of the records at the supply station is followed by a record follower element 158 carried by a vertically movable rod 159.

*Tone arm and support*

The reproducer or tone arm B and its support are designed for automatically first playing one side and then the other side of a record at the playing station. To this end the tone arm B and its support are vertically movable for successively positioning the tone arm first on one side of the record and then on the other side of the record, the latter being fixed in a horizontal plane, the tone arm and its support being also automatically moved horizontally into and out of playing position. The tone arm and support and these movements imparted thereto are particularly illustrated in Figs. 3 to 8 of the drawings.

Referring now to Figs. 3 to 8 of the drawings, the tone arm and support comprise a reproducer or tone arm 42 mounted on a support 43, the tone arm being provided at its playing end with a pick-up device 44 which may be of the crystal type. A single crystal pick-up may be provided having on its opposite sides the two styli 45 and 46 for bottom and top side record playing respectively. Electrical connections to the pick-up device are by way of the conductors 47 which extend through and are housed by the tubular part of the tone arm 42. The tone arm may conveniently be formed by a central tubular part 48, a terminal plate part 49 which supports the pick-up, and an opposite terminal box part 50. The tone arm is pivotally mounted for movement within limits in a vertical plane on and relative to the support 43 by being pivotally mounted at 51 to a horizontal bar 52 fixed to and extending from the support 43 which latter, in the embodiment shown, comprises a rod which is mounted for vertical or axial movement in the bearing piece 53 secured to the platform 4 of the phonograph.

Figures 6, 7, 8:
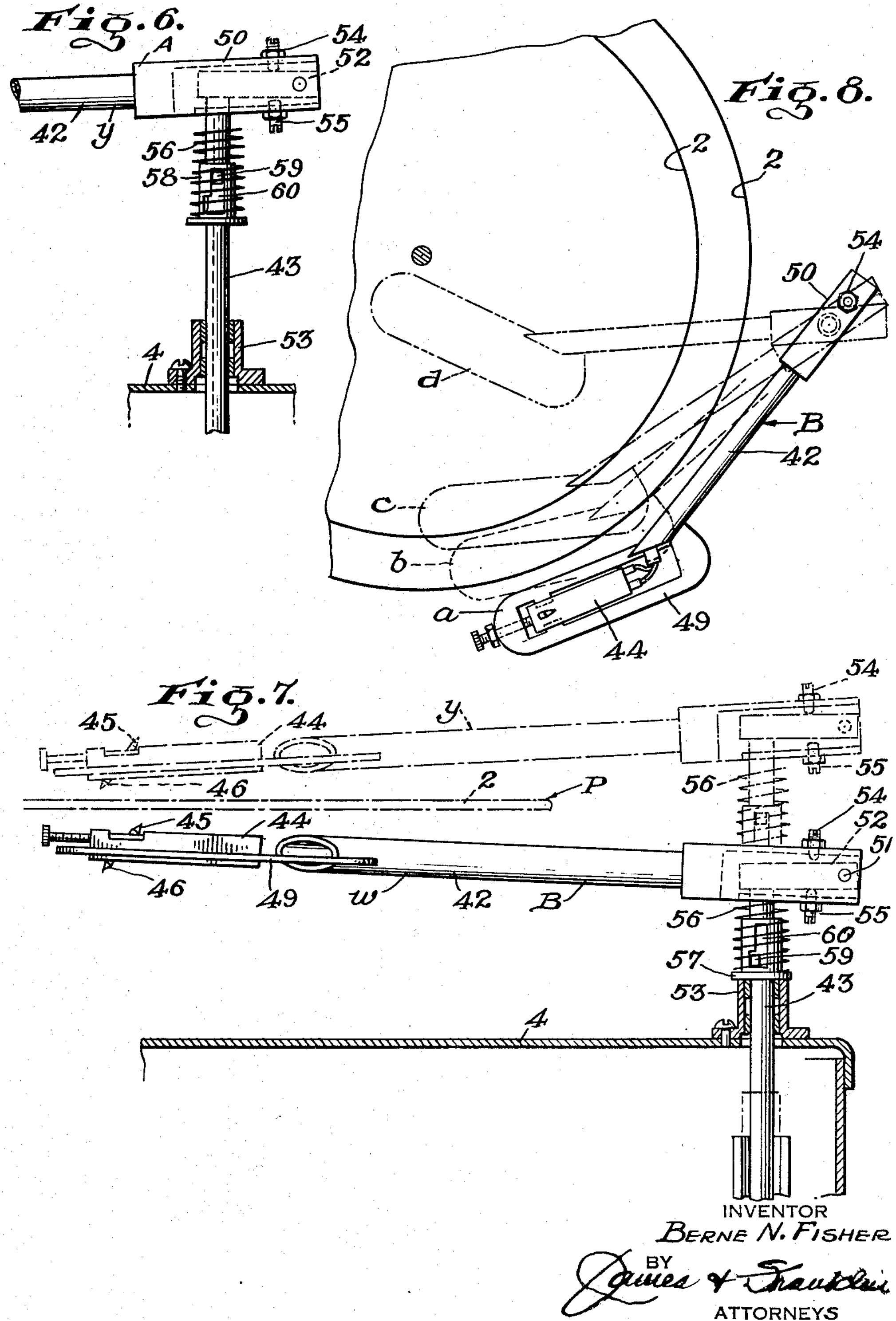
Fig. 6 is a view similar to Fig. 5 showing the parts in a different position of operation.
Fig. 7 is a view of the reproducer or tone arm and the support therefor corresponding to Fig. 3 but showing the parts in a different position.
Fig. 8 is a fragmentary top plan view (with a part shown in section) of part of the phonograph apparatus depicting a movement of the tone arm.
Figure 9:
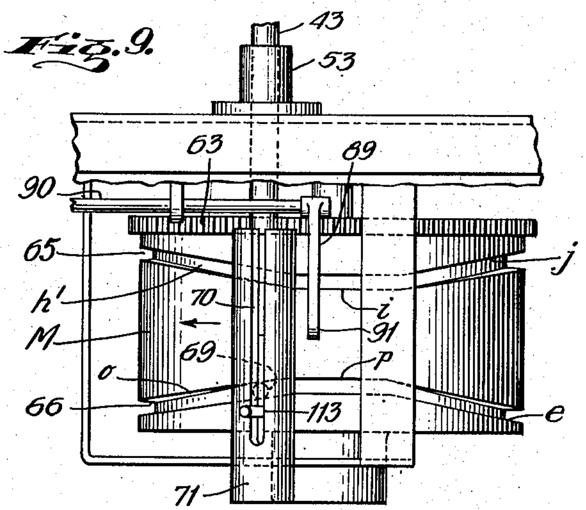
Fig. 9 is an elevational view showing the cam mechanism for operating the tone arm.
Figure 10:
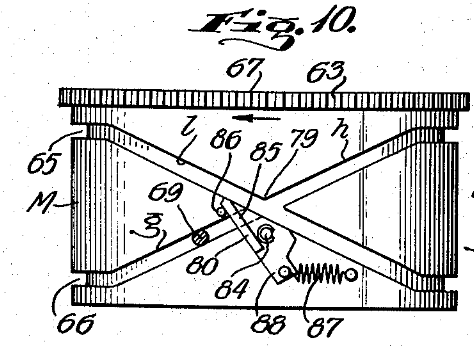
Fig. 10 is an elevational view of the cam mechanism for operating the tone arm showing one operative phase thereof.
Figure 11:
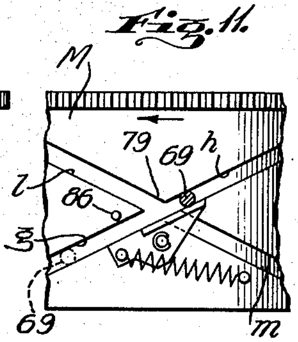
Figs. 11 to 15 are fragmentary views of this cam mechanism showing sequential different operative phases thereof.
Figure 12:
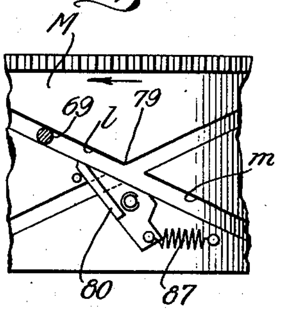
Figure 13:
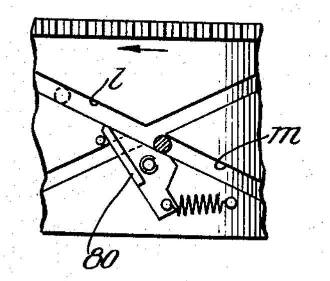

The tone arm is movable or swung horizontally into and out of playing position for either the top side or the bottom side of the record at the playing station, and four of such positions are depicted in Fig. 8 of the drawings for explanatory purposes. The tone arm is moved vertically to the playing positions for opposite sides of the record, and four of such positions are depicted in Figs. 3, 5, 6 and 7 of the drawings for explanatory purposes. These positions will now be first described.

When the machine is started, the tone arm 42 is in the outermost or stop position *a* (see Fig. 8). In the first operating cycle (for either top side or bottom side playing), the tone arm 42 will be automatically moved to and positioned in its initial playing position *b* for a 12 inch record 2 and will be automatically moved to and positioned in its initial playing position *c* for a 10 inch record 2. The tone arm will then be moved by stylus engagement with the record to the innermost or end groove position *d*. Upon reaching this end position, the tone arm will then automatically be moved away from record engagement and then will be moved to its initial or outside position *a*, and if another record is to be played, will be automatically returned to either its *b* or *c* position depending upon the size of the record to be played.

In the sequence of playing the opposite sides of a record 2, the tone arm will be positioned first for one side playing and then for the other side playing; and in the embodiment here illustrated, the sequence is bottom side playing first and top side playing next. In the movement of the tone arm for this sequence, the tone arm assumes the four different positions *w*, *x*, *y* and *z* depicted in Figs. 3 and 7 of the drawings, these positions being respectively as follows:—bottom side playing with the tone arm out of record engagement, bottom side playing with the tone arm in record engagement, top side playing with the tone arm out of record engagement, and top side playing with the tone arm in record engagement. For bottom side playing, the stylus 45 is operative, and for top side playing, the stylus 46 is operative.

A complete sequence of movement including the horizontal and the vertical movements imparted to the tone arm for the playing of the opposite sides of a record just moved to the playing station P is as follows: the tone arm A is first swung inwardly from its *w—a* position to the position *w—b* for a large size record or *w—c* for a small size record, the tone arm being now ready to be elevated into record playing engagement for the bottom side playing of the record. The tone arm is then moved (elevated) to the position *x—b* or *x—c* (depending upon the size of the record), and, therefore, into engagement with the initial groove at the bottom of the record. The bottom of the record is then played moving the tone arm to the position *x—d*. At the finish of the playing of the bottom side of the record, the tone arm will be automatically moved (dropped) first away from record engagement to the position *w—d* and then will be swung outwardly to the position *w—a* at which point the tone arm will be bodily lifted vertically to the position *y—a*. Thereupon the tone arm will be swung inwardly into its initial playing position *y—b* or *y—c* depending upon the size of the record, whereupon the tone arm will be dropped into playing engagement with the top side of the record into the position *z—b* (or *z—c*). The top side of the record will thereupon be played until the tone arm reaches the inner terminal or end groove record position *z—d*, whereupon the tone arm will be automatically lifted to the position *y—d* and then swung outwardly to the position *y—a* after which the tone arm will be bodily moved downwardly or dropped to the position *w—a* and thus into its initially assumed position and in position to be again moved into the initial playing position for engagement for the bottom side playing of the next record 2 which is drop-fed to the playing station P.

Figures 3, 4, 5:
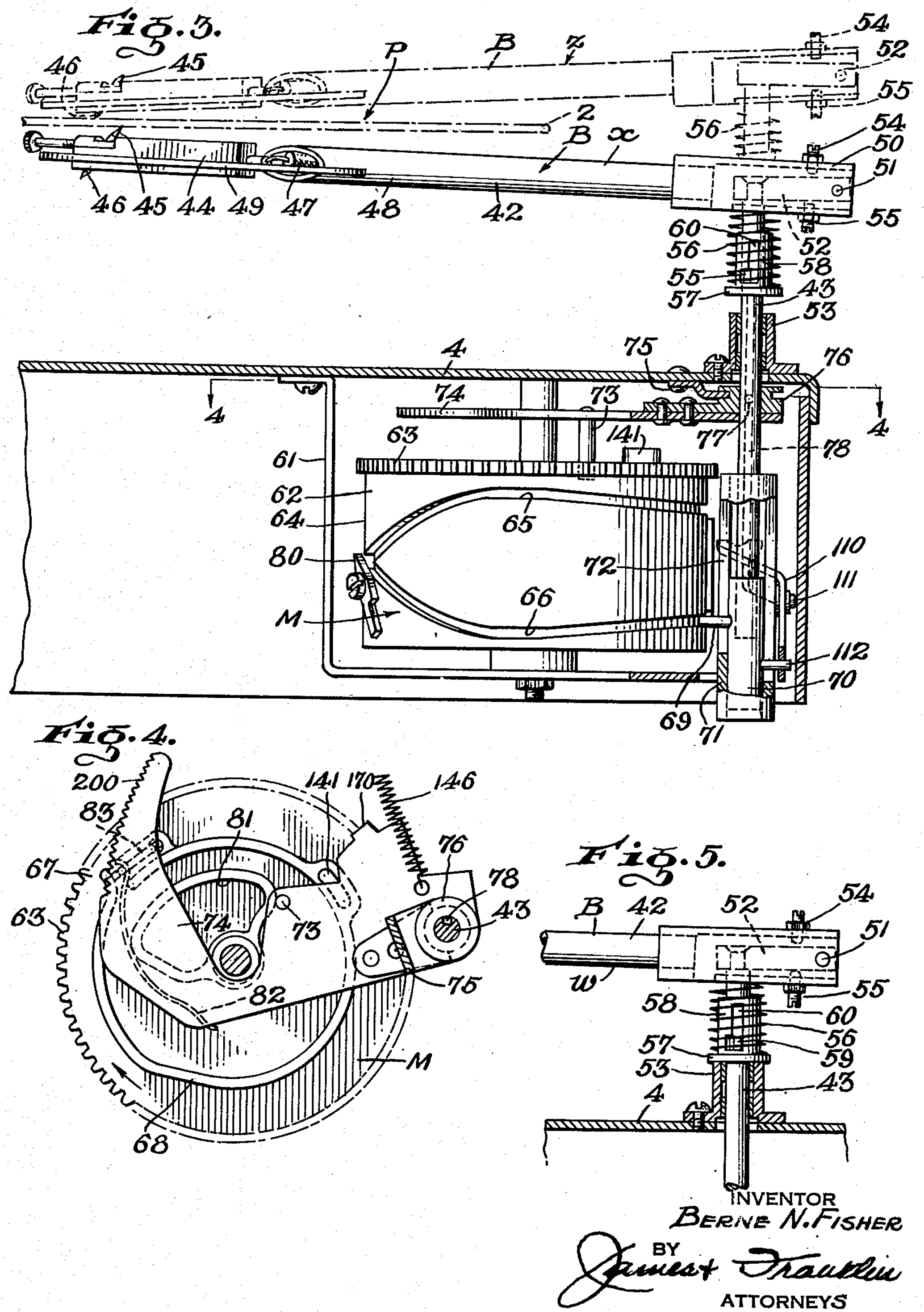
Fig. 3 is a vertical elevational view with parts shown in section of the reproducer or tone arm and its supporting and operating mechanism.
Fig. 4 is a view of the latter taken in cross-section in the plane of the line 4—4 of Fig. 3.
Fig. 5 is a fragmentary view of the tone arm and support showing the same in one of the positions assumed during its operation.

For imparting these movements to the tone arm, the support 43 therefor is vertically or axially movable between the lower and upper positions illustrated in Figs. 3 and 7 of the drawings, and is rotated horizontally about the axis of the support between the extreme positions shown in Fig. 8 of the drawings. The tone arm 42 and its mounting or support 43 are preferably so designed that for top side playing the tone arm is weight-loaded and for bottom side playing it is spring-loaded. This construction affords the right degree of pressure to be exerted on the stylus for playing both of the opposite sides of the record. To accomplish these desired ends, the tone arm 42 is pivotally mounted as aforesaid by means of the pivot 51 on the supporting bar 52 between limits, the said limits being defined by the two stop members (adjustable) 54 and 55 mounted on the box part 50 of the tone arm in positions to engage or to be engaged by the support bar 52. Surrounding the rod support 43 is a compression spring 56 the upper end of which is adapted to engage the tone arm box part 50 and the lower end of which is adapted to engage a flange 57 of a collar 58, the collar being axially and rotatably movable on the rod support 43. The rod support is also provided with a pin 59 which mates with an L-shaped slot 60 formed in the collar.

With this construction the following functions are accomplished: for bottom side playing, the spring 56 is effective for spring-loading the tone arm and for top side playing the weight of the tone arm is utilized for weight-loading the same. The weight-load and spring-load may be readily determined or adjusted so that the proper engagement pressure between the styli and the record is secured for both the bottom side playing and the top side playing of the record. The collar 58 so functions that it not only provides a bearing and holder for the spring 56, but it is movable away from fixed parts of the machine during the playing of the bottom side of the record so as to eliminate any resisting friction that would otherwise be due to the same.

The operation of this recited mechanism may be more fully seen by following through a sequence of movement of the tone arm. When the tone arm is in the position *w—a* the tone arm support 43 is in the position shown in Fig. 5 with the flange of the collar 58 in engagement with the stationary bearing 53 and the spring 56 in compressed condition. The tone arm 42 is thereby moved to the position shown in Fig. 5, the stop 55 being in engagement with the bottom side of the support bar 52, this being one of the limiting positions of the tone arm. During the initial rotation of the support 43, the pin 59 moves horizontally in the wide part of the slot 60 and thereafter the collar 58 is rotated until the tone arm assumes the position *w—b* (or *w—c*). The support 43 is then lifted for moving the tone arm into bottom side record engagement and thus to the position *x—b* or *x—c*, the position shown in Fig. 3 of the drawings. The collar 58 has thereby been lifted by the pin 59 to disengage the bearing 53 and the spring 56 in compressed condition exerts the degree of pressure necessary to spring-load the tone arm for the playing operation. The tone arm, however, has been depressed against the action of the spring 56 away from its *w* position, thereby relieving the tone arm from the stop 55 and permitting the degree of vertical pivotal movement of the tone arm on its support necessary for a playing operation. In the continued operation of the machine the reverse movements of the parts just described will take place up to the point that the tone arm reassumes the assumed starting position *w—a*. The support 43 is thereupon axially elevated to the position *y—a* depicted in Fig. 6 of the drawings. In moving to this position, the collar 58 drops to the position shown in Fig. 6, thereby releasing the spring 56 from the tone arm and permitting the weight alone of the tone arm to become active. In this position the top stop 54 of the tone arm box 50 engages the top side of the support bar 52 as shown in Fig. 6, this being the other limiting position of the tone arm, sustaining the weight of the tone arm. The tone arm is then moved into the position *y—b* or *y—c* and thereupon into initial playing engagement with the record to the position *z—b* or *z—c*. When moved to the last mentioned position, the stop 54 is lifted free from the bar 52 (see dot-dash line position in Fig. 3), and the weight of the tone arm is active for stylus engagement with the top of the record, the tone arm being also thereupon permitted the free vertical movement about its axis necessary or desirable for the playing of the record. The reversing of these latter mentioned operations takes place when the tone arm at the groove end of the playing of the top side of the record is lifted from the record, swung outwardly, and then moved to the position for bottom side playing.

*Tone arm operating mechanism*

The mechanism for operating the tone arm through the described sequence of operations may be described by reference to Figs. 3, 4, 7, 8, 9 to 15, and 16. This mechanism comprises a main cam M suspendedly mounted for cyclic rotation from the phonograph platform 4 in the bracket 61 provided with cam parts connected through the medium of cam followers for operating the tone arm support or mount 43.

Figure 18:
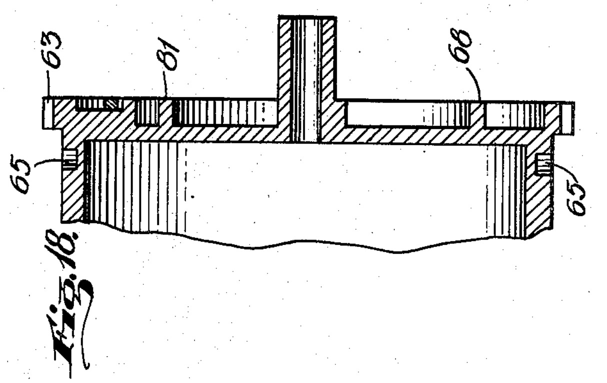
Fig. 18 is a fragmentary view of the cam of Fig. 17, taken in cross-section in the plane of the line 18—18 of Fig. 17.
Figure 17:
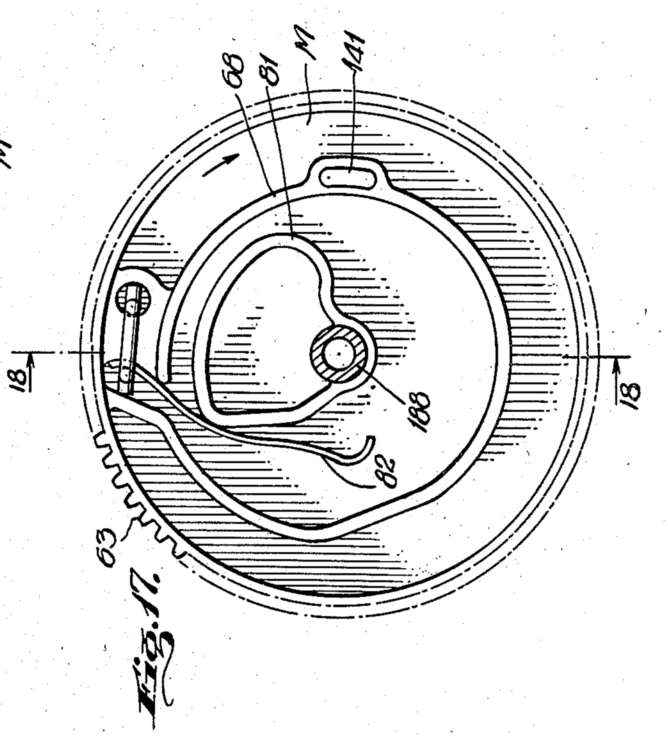
Fig. 17 is a top plan view of the cam shown in Fig. 10 but drawn to a larger scale.

The cam M in the embodiment shown comprises a cylindrical or drum-shaped member 62 peripherally formed with an operating gear 63, the cylindrical side wall 64 of which is provided or formed with a first cam part 65 for operating the tone arm for top side playing and a second cam part 66 for operating the tone arm for bottom side playing, and another, as, for example, the top wall 67 of which is provided or formed with a third cam part 68 for swinging the tone arm to and from playing relation with the record. The cam parts 65 and 66 each preferably comprises an annular cam track. The cam part 68 is of a compound nature best depicted in Figs. 4, 17 and 18 of the drawings. Coacting with the cam tracks 65 and 66, is a cam follower device comprising in the embodiment shown a cam pin 69 fixed to a plunger 70 vertically movable in a cylindrical pot 71. The cylindrical pot is longitudinally slotted at 72 and this in conjunction with the follower pin 69 constrains the plunger 70 for vertical movement in the pot. The tone arm rod support 43 is rotatably fitted at its bottom end in the plunger 70 so that the rod support 43 is vertically movable with but is rotatable in the plunger 70. Mating with the cam track 68 is another cam follower device comprising a cam pin 73 secured to a sweep arm 74, the said sweep arm being suspended from the platform 4 by means of the fork 75, the sweep arm being rotatable in said fork and about the axis of the rod support 43. The attaching bearing 76 of the sweep lever is provided with a pin 77 (Fig. 3) which projects into a longitudinal groove 78 formed in the rod support 43.

Figure 16:
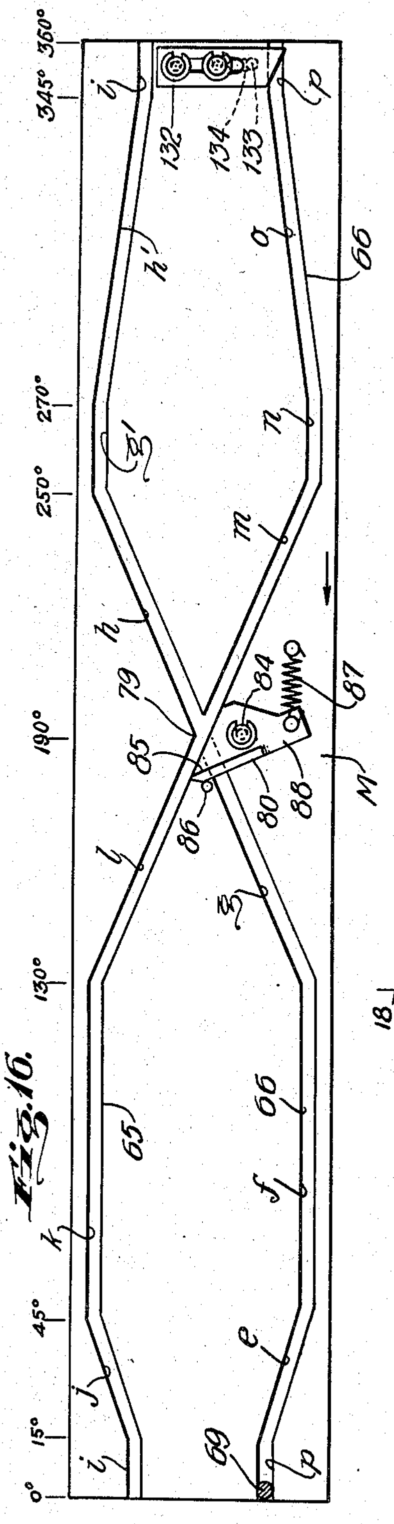
Fig. 16 is a development view of the cam mechanism shown in Fig. 10.

The annular cam tracks 65 and 66 are best shown in the development of the cam side wall depicted in Fig. 16. These cam tracks are shaped as here shown comprising annular cam grooves provided with a cross-interconnection 79. This cross-interconnection forms part of a means for causing the cam follower 69 to coact first with one cam part or track 65 and then with the other cam part or track 66 for effecting successive playing of opposite sides of the record. At this cross-connection 79 there is provided a mechanical switch device or frog 80 which is controlled for directing a cam follower from one to the other of the cam tracks for accomplishing a number of purposes to be described.

The compound cam track 68 and its cooperation with the sweep lever 74 are in themselves known and are shown and described, for example, in the copending application of Kenneth R. Bender, Serial No. 565,588 for Record Changer Phonograph, filed November 29, 1944, now Patent No. 2,545,643, issued March 20, 1951. In a cycle of rotation of the cam M, the sweep arm 74 beginning with its tripping position shown in Fig. 4 is swept outwardly by the engagement of the cam follower pin 73 with the inner cam rib 81 and is moved thereby into the space between this cam rib and the cam track 68. Further rotation of the cam then causes the follower to be engaged by a leaf spring 82 anchored at 83 in the top wall of the main cam for moving the sweep lever inwardly to an initial playing position for large or small size records, the latter position being determined by other mechanism to be described. The outward and inward swinging movements of the sweep arm 74 are transmitted by the elements 76, 77 and 78 and the support or mount 43 of the tone arm to corresponding outward and inward swinging movements of the tone arm.

The movement of the cam follower pin 69 in the annular cam track 65 and 66 and, therefore, cross-interconnection 79 determine the bodily vertical movement of the tone arm B as above described, the vertical movement of the follower pin 69 being translated into the corresponding vertical movement of the tone arm support rod 43 by the means comprising the plunger 70 and its connection to the rod 43. It will be observed that the rotation of the rod in the plunger enables the rod to be also rotated by the sweep arm for accomplishing the in and out sweeping or shifting movement of the tone arm.

The stationary or home position of the main cam M is that shown in Fig. 3 of the drawings. Figs. 10 to 15 show this main cam in various phases of its operation for moving the cam follower pin 69 and consequently the tone arm and its support vertically through various positions for top and bottom side playing of the record. By reference to these figures and the development view of Fig. 16, the complete sequence of operation for top and bottom side playing may be described.

It will be assumed for a starting point that the tone arm has been located at its initial playing position for bottom side of the record. This is the position shown in Fig. 3, the cam M being stationary. The record is played and the sweep lever then assumes the position shown in Fig. 4. When the terminal record groove is reached, the machine is tripped and the operation of the cam M is initiated. The cam is rotated for a complete cycle or revolution in the direction indicated by the arrows in Fig. 4, Figs. 7 to 15, and Fig. 16.

The vertical movements imparted to the cam follower 69 and consequently to the tone arm for successive cycles for the playing of both sides of the record may be traced by reference to the cam development shown in Fig. 16 of the drawings. The cam follower 69 is in its starting position in the bottom cam track 66. In the first cycle of rotation of the cam, the cam follower 69 will move through the track section $e$ of the lower cam track 66 for causing the movement of the tone arm from its $x$ position to its $w$ position (Figs. 3 and 7). When the cam follower moves through the track section $f$, this position is held and it is during this period that the tone arm is swung outwardly to its $a$ position. In the continued rotation of the cam, the cam follower is constrained to move through the track sections $g$ and $h$ past the cross-connection 79 and thereby the tone arm is lifted to its $y$ position (Fig. 7). As the cam continues its rotation, the cam follower moves through the cam track section $g'$ and thus the $y$ position of the tone arm is maintained; it is during this period that the tone arm is moved from its $a$ position to its initial playing position $b$ or $c$. As the cam furthers its rotation, the cam follower moves in the cam track section $h'$ and thereby the tone arm is moved from its $y$ position to its $z$ or playing position. During the playing position, the cam follower is located in the cam track section $i$. In moving from the track section $g$ to the track section $h$, the switch or frog 80 becomes operative in a manner to be later described. The top side of the record is then played until the position of the tone arm for top side playing also illustrated in Fig. 4 is reached. The machine is again tripped and the cam M again set into rotation for a cyclic operation. As the follower now moves through the cam track section $j$ of the upper cam track 65, the tone arm is lifted from its $z$ position to its $y$ position. In the continued rotation of the cam, the cam follower moves through the cam track section $k$ to maintain the $y$ position of the tone arm; it is during this period that the tone arm is swung outwardly from its $d$ position to its $a$ position (Fig. 8). As the cam continues its rotation, the cam follower is constrained to move downwardly through the track sections $l$ and $m$ past the cross-connection 79 and into the lower cam track 66. During this motion the tone arm is moved from its $y$ position to its $w$ position while it is held in its outward or $a$ position. In the continued rotation of the cam, the cam follower then moves through the cam track section $n$, during which time the tone arm is held in its $w$ position; during this period the tone arm is moved inwardly to its initial playing position $b$ or $c$ for bottom side record playing. In the further rotation of the cam, the cam follower moves through the cam track section $o$ and thereby moves the tone arm from its $w$ to its $x$ position, and, therefore, into playing engagement with the record on its underneath side. The rotation of the cam stops for the cam follower in the cam groove section $p$ at which time the bottom side of the record is being played. When the end of the playing of this side of the record is reached, the first of the two cycles described is repeated.

The cross-connection 79 determines the movement of the cam follower from either annular cam track to the other. The mechanical switch or frog 80 is provided for effecting the positive guiding movement of the cam follower from one cam track to the other. The frog or switch comprises a lever pivoted at 84 on the cam M at the track intersection, the said lever having an arm 85 which extends normally across the second cam track 66 being stopped in this position by a pin 86 and being urged to this position by a spring 87 active on the other arm 88 of the frog or switch lever. Normally then the frog assumes the position shown in Figs. 10 and 18. When in a cyclic rotation of the cam M, the cam follower moves from the bottom cam track through the track section $g$, the cam follower engages the protruding arm of the frog and moves the latter to the position shown in Fig. 11 of the drawings, the cam follower 69 being thereby compelled to track over the cam track $m$ and to move into the cam track $h$, and, therefore, into the upper cam track 65. On the next cycle of operation, when the cam follower 69 is moving downwardly from the top cam track and through the cam section $l$, the gravity of the parts will cause the cam follower to move into the track section $m$ and this movement takes place over the top edge of the frog 80 as indicated sequentially in Figs. 12 and 13 of the drawings. Thus for this operation, the frog or switch remains in its normal and unmoved position. In the next cycle of the cam, the switch again guides the return movement of the cam follower from the lower or second cam track 66 to the upper or first cam track 65, in the manner described. Sequential movement through bottom and top side playing of the records is, therefore, assured.

Figure 14:
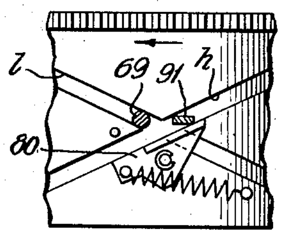
Figure 15:
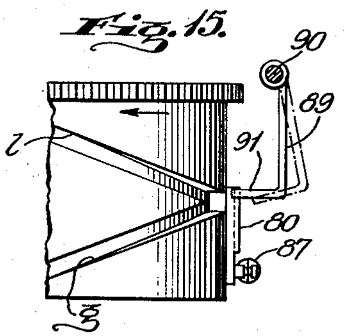

The frog or switch 80 is also utilized to accomplish another important function in a simple way. When it is desired to operate the phonograph for the playing of only one side of a supply of records, such, for example, as the top side, the frog or switch 80 is operated during each cycle of rotation of the cam just in advance of the cam follower 69 reaching the intersection, and thereby the cam follower 69 is prevented from entering the second or bottom cam track and is constrained to move only through the first or top cam track so that the tone arm is operated for successive cam cycles only to its upper position, and, therefore, only for top side playing. This is accomplished by a simple angle lever 89 pivoted on the framework at 90 (see Fig. 15), normally occupying the out of the way dot-and-dash line position shown in Fig. 15, which lever, when moved into its full line position shown in Fig. 15, interposes its angle arm 91 in the path of movement of the frog 80 on the cam. The angle lever 89 is positioned with reference to the cam follower 69 as depicted in Fig. 14 of the drawings. Consequently, as shown in Figs. 14 and 15 of the drawings, when the angle lever is moved to its full line position, it engages the frog 80 when the cam is rotated to the position shown in Fig. 14, thereby moving the frog or switch to its lower track closing position shown in Fig. 14 and then upon the next incremental movement of the cam, the cam follower 69 is caused to move from the track section $l$ to the track section $h$ and thus from the first or upper track 65 back to the upper track 65. This operation takes place during each cycle of the cam so long as the angle lever 89 is in the full line position. Therefore, during each cycle of the cam under this condition, the upper or first cam track only is operative and, therefore, the machine will be conditioned for top side playing only of a supply of records. The angle lever 89 may be operated by a simple manual control linkage.

The operation of the reproducer or tone arm and the operating mechanism therefor of the present invention and the many advantages thereof for use with the described record changer phonograph of the drop-feed or gravity type will in the main be fully apparent from the above detailed description of the structure and its operation.

It will be further apparent that many changes may be made in the described structure without departing from the spirit of invention defined in the following claims.

I claim:

1. In a phonograph in which a record is supported in a horizontal plane at a playing station for playing opposite sides of the record, the combination of a tone arm, a vertically movable mount therefor, and mechanism for vertically moving the mount to lift the tone arm above the record for top side playing and to drop the tone arm below the record for bottom side playing, said mechanism comprising a rotatable cam member having a first cam part for top side playing and a second cam part for bottom side playing, a cam follower device coacting with said cam parts having connections with said tone arm mount, and means for causing the cam follower device to coact first with one cam part through a cycle of rotation of said cam and then the other cam part through the next cycle of rotation of said cam for effecting successive playing of opposite sides of the record.

2. In a phonograph in which a record is supported in a horizontal plane at a playing station for playing opposite sides of the record, the combination of a tone arm, a vertically movable and rotatable mount therefore, and mechanism for vertically moving the mount to lift the tone arm above the record for top side playing and to drop the tone arm below the record for bottom side playing and for rotating the mount to move the tone arm into and out of playing position, said mechanism comprising a rotatable cam member having a first cam part for top side playing, a second cam part for bottom side playing and a third cam part for rotating the mount, a cam follower device coacting with said first and second cam parts having connections with said tone arm mount, means for causing the cam follower device to coact first with one cam part through a cycle of rotation of said cam and then the other cam part through the next cycle of rotation of said cam for effecting successive playing of opposite sides of the record, and a second cam follower device coacting with said third cam part having connections with said tone arm mount.

3. The phonograph combination of claim 1 in which the cam parts on the cam member comprise two cam tracks having a cross interconnection.

4. The phonograph combination of claim 1 in which the cam parts on the cam member comprise two annular cam grooves having a cross interconnection.

5. The phonograph combination of claim 1 in which the cam parts on the cam member comprise two cam tracks having a cross interconnection and in which the last recited means comprises a mechanical switch located at the cross interconnection.

6. In a phonograph in which a record is supported in a horizontal plane at a playing station for playing opposite sides of the record, the combination of a tone arm, a vertically movable mount therefor, and mechanism for vertically moving the mount to lift the tone arm above the record for top side playing and to drop the tone arm below the record for bottom side playing, said mechanism comprising a cam member having a first cam part for top side playing and a second cam part for bottom side playing, said cam parts comprising two cam tracks having a cross interconnection, a cam follower device coacting with said cam parts having connections with said tone arm mount, and means for causing the cam follower device to coact first with one cam part and then the other cam part for effecting successive playing of opposite sides of the record, the said last recited means comprising a switch device located at said cross interconnection.

7. The combination of claim 6, in which the switch device is movable and extends across one of the cam tracks to be moved by said cam follower.

8. In the combination of claim 6, means for moving said switch device to cause the cam follower to move from the second to the first cam track.

9. The combination of claim 6, in which the switch device extends across the second cam track and is movable by the cam follower to a position to cause the cam follower to move from the second to the first cam track.

10. In the combination of claim 6, means for moving the switch device to block movement of the cam follower from the first to the second cam track so as to cause a repeat movement of the cam follower through the first cam track.

11. In the combination of claim 6, means movable into the path of movement of said switch device in the operation of the cam member for moving the switch device to a position to block movement of the cam follower to the second cam track whereby the cam follower will move repetitively through the first cam track.

BERNE N. FISHER.

REFERENCES CITED

The following references are of record in the file of this patent:

UNITED STATES PATENTS

| Number | Name | Date |
|---|---|---|
| 1,734,649 | Shull | Nov. 5, 1929 |
| 2,313,262 | Pressley | Mar. 9, 1943 |
| 2,457,668 | Hart | Dec. 28, 1948 |

FOREIGN PATENTS

| Number | Country | Date |
|---|---|---|
| 111,950 | Sweden | Sept. 26, 1944 |
| 417,305 | Great Britain | Oct. 2, 1934 |
| 822,026 | France | Sept. 6, 1937 |